United States Patent Office 2,917,389
Patented Dec. 15, 1959

2,917,389

COCONUT PRODUCTS AND TECHNIQUE FOR PRODUCING THE SAME

Ernest L. Earle, Jr., New City, Boleslaw Sienkiewicz, Pearl River, and Lawrence H. Stone, Brooklyn, N.Y., assignors to General Foods Corporation, White Plains, N.Y., a corporation of Delaware No Drawing. Application August 11, 1958
Serial No. 754,156

9 Claims. (Cl. 99—125)

This invention relates to new coconut products having improved texture, flavor, storability, and appearance and to a method of producing the same.

Fresh coconut meat consists of radially arranged, generally six-sided, closely packed individual cells which have fairly rigid cell walls, and organized cell contents which appear to consist of an oily protoplasm containing colloidal and proteinaceous material. The average water content of fresh coconut meat may be 50%. When fresh coconut meat is shipped, the expense of these operations is proportionately greater because of the large amount of water present. In addition to the difficulties inherent in handling the extra weight resulting from the water content, presence of such large amounts of moisture increases the rate of deterioration of the shelled coconut meat. The coconut meat spoils, becomes brown and moldy, and otherwise deteriorates sufficiently quick to make it substantially impossible to store chunks or large pieces for any substantial period. It has been found that if the moisture content of the coconut meat is lowered, it may be stored for longer periods of time with a minimum of deterioration.

In an attempt to produce marketable dried coconut, various techniques have been applied to chunks which may have dimensions of one-quarter to one-eighth inch. Drying chunks of this size by conventional techniques is slow and tedious and it is not readily possible in a reasonable time to obtain a white product containing less than about 3.5% moisture. In fact, attempts to dehydrate chunks of coconut meat having dimensions larger than about 0.25 to 0.50 inch have heretofore given a product which is undesirably dark brown in color, non-tasty, and hard to the point of inedibility. Attempts to lower the moisture content of chunks of fresh coconut meat to about 1% or less (by weight) while simultaneously retaining the many desirable properties of the fresh meat, have been uniformly unsuccessful. Specifically the products prepared by the heretofore unsuccessful attempts to lower the moisture content of coconut chunks to the above-noted extent, have been extremely hard and leathery at the surfaces and difficult or impossible to chew. In some processes, the drying time has been so long that the coconut has spoiled even before the moisture content was reduced by any great amount.

It has not heretofore been possible by use of conventional drying techniques known to those skilled-in-the-art to prepare a white, tasty, crisp, coconut chunk which has extended storage life as evidenced e.g. by resistance to discoloration. Furthermore, prior attempts to extend shelf life by reducing the moisture content of coconut chunks to 1% or less have not been successful because the steps employed to lower the moisture level to this point have in fact accelerated the deterioration of the coconut and thereby shortened its shelf life.

Those skilled-in-the-art have heretofore attempted to impart more desirable characteristics to dried coconut by using drying processes which have been successful with other foods. For example, it has been proposed to modify the various conditions of temperature, time, pressure, etc. or the physical techniques employed to get a product having the desired characteristics. None of these prior art processes—which are characterized by use of uneconomical operating conditions in complicated or delicate machinery requiring high capital outlay and high operating costs—has given a consistently satisfactory coconut product with respect to texture, flavor, appearance, storage life, and reconstitutability.

It is an object of this invention to provide novel forms of coconut. A further object of this invention is to disclose a process according to which the new coconut products of this invention may be prepared. Other objects will be apparent to those skilled-in-the-art on inspection of the following description.

It has now been discovered that dehydrated coconut products preferably as discrete chunks, may be prepared which possess whiter color, better texture, and a highly desirable flavor which endures over an extended storage life. It is particularly characteristic that chunks of coconut meat when dried in accordance with this invention have a highly satisfactory texture, a low moisture content, typically less than about 1%, and a density of about 15 pounds per cubic foot or less. The bulk of the chunks is crisp and friable and comprises a plurality of coconut cells in arrangement more-or-less similar to that present in fresh coconut. The surface of the product possesses a desirable crispness on chewing and it appears to be just slightly more resistant to chewing than is the bulk of the chunk. As the chunk is eaten, the consumer derives therefrom a pleasant mouth character based upon the crisp, crunchy nature of the coconut product.

According to certain of its aspects, dehydrated coconut chunks are obtained in accordance with this invention by slowly freezing coconut at an environmental temperature of less than 20° F. and typically between minus 30° F. and minus 40° F., and then air-drying the coconut in shallow beds by passing warm 140°–180° F. air through the bed at superficial velocity of at least about 100 feet per minute and typically 100–150 feet per minute for time which typically is 4–5 hours, to yield a dehydrated product containing preferably less than about 1% moisture.

Although the process of this invention may be carried out in connection with coconut pieces of any size, it is particularly effective when applied to pieces of such dimensions, i.e. larger than about 0.25 inch, that they cannot be effectively dried to low moisture content by prior art processes. Under preferred operating conditions, the fresh coconut meat treated may be in the form of more-or-less cubical chunks and may typically be of size less than 0.5 inch in their greatest dimension e.g. 0.25 x 0.25 x 0.5 inch.

These chunks, which may be subjected to preliminary treatment including washing, are frozen at environmental temperature which preferably is less than 20° F. and typically within the range between minus 30° F. and minus 40° F. Although freezing may be effected at lower coconut temperatures, no significant advantages are thereby obtained. When freezing is attempted at higher coconut temperatures than the indicated range, the texture of the product is found to be less desirable (i.e. the product is characteristically and noticeably less crisp and crunchy to the taste) and it has a much shorter storage life. Freezing under these conditions at atmospheric pressure will be conducted slowly i.e. for a time which is at least long enough to insure that the coconut meat is substantially uniformly frozen. This may be as long as 16–24 hours, i.e. slowly. It will be apparent that the gross cooling rate will be slow e.g. typically 40° F. to 100° F. temperature drop per 16 to 24 hours. Although longer freezing times may be employed, shorter freezing times do not consistently give the desired texture or shelf life to the product. Freezing slowly between minus 30° F. and minus 40° F. for 16 or 18 to 24 hours gives a frozen coconut which can readily be air dried to yield a product possessing the highly desirable properties hereinbefore set forth, particularly extended storage life.

After freezing, the coconut is immediately ready for further treatment. If desired the frozen coconut can be permitted to thaw before being subjected to dehydration. However, thawing as a separate step is not necessary and whether or not it is done will depend upon the particular processing requirements which prevail. When thawing is done, the ensuing drying should preferably occur after not more than about 3–4 hours thereafter.

To effect air-drying, the frozen coconut chunks will be loaded on drying trays in shallow beds, preferably about 1.5 inches or less in depth. If desired, the coconut chunks may be dried in a monolayer, which may be about 0.25–0.5 inch in depth.

The loaded trays of coconut are placed within an air drier, which is a completely enclosed unit wherein conditions may readily be controlled. Typically such a unit is a Proctor and Schwartz air drier. Drying is accomplished by passing air through the shallow bed of coconut at superficial air velocity of at least 100 feet per minute, and typically within the range of 100–150 feet per minute. It has been found that operation at these air rates permits attainment of the novel product herein described, whereas use of lower air rates gives a product which does not have the same texture and which is not as readily capable of being stored for extended periods of time.

Preferably the inlet air temperature to the drying operation is 140–180° F., although for best results it will be above about 140–170° F. When this air temperature is at the desired level, temperature of the coconut within the beds will not exceed about 120–150° F.

Under the preferred conditions of operation as indicated, the moisture content of the coconut drops quickly but without detrimental effect upon the coconut. The moisture content, which originally was about 50%, may drop to e.g. about 20% after ½ hour and thence to about 10% after 1 hour. Further drying brings the moisture content down e.g. to about 5% after 1.5 hours, to about 2.5% after 2 hours, to about 1.5% after 3 hours, and to about 1% after somewhat over 4 hours. Usually a drying period of 4–5 hours is sufficient to bring the moisture content to about 1% or less. Under certain conditions however, it may be desirable to reduce the moisture content only to 5%, and this can be done as indicated within a period as brief as 1.5 hours. It is found however that particularly desirable results in terms of extended storage life and desirable texture are obtained when the drying process is continued until the moisture content of the product coconut is about 1% or less.

The dehydrated coconut product of this invention has substantially the same physical shape and size as that of the fresh coconut chunk from which it was prepared. It is characteristically snow white in color. Its bulk density may be the order of 15 pounds per cubic foot in contrast to that of fresh coconut which is about 30–40 pounds per cubic foot. Inspection of the chunks reveals that they contain a large number of minute perforations or voids. The product is superficially dry and crispy. When it has a moisture content of about 1% or less, as it will when prepared under the most desirable conditions, it can be stored for extended periods without deterioration. The product does not turn brown.

According to a specific example of the process of this invention, fresh coconuts were shelled, peeled, subjected to pretreatment including washing, and chopped into pieces having dimensions approximately 0.25 x 0.25 x 0.5 inch. Moisture content of the pieces averaged about 50%. The pieces were placed within a freezing box maintained at temperature of minus 30° F. wherein they were permitted to stand for 24 hours during which time they froze slowly.

The frozen particles of coconut at minus 30° F. were then placed in layers having a depth of 1.5 inches in a Proctor and Schwartz air drier having 4 square foot drying trays. Air at temperature of 173° F. was passed downwardly through the beds of coconut at a superficial velocity of 150 feet per minute.

Drying was continued for period of 4 hours and 15 minutes, and during drying, moisture content was checked. After 1 hour moisture content was 10%; after 2 hours' moisture content was 2.5%; after 3 hours it was 1.7%; after 4 hours it was 1.3%; at the conclusion of the test it was 0.95%.

The product has excellent texture as determined by visual inspection and test. It was snow-white in color and crisp, crunchy, and friable. The entire mass was porous and contained numerous small voids and perforations. The bulk density was about 15 pounds per cubic foot. The surface appeared to be just slightly more resistant to the bite than was the bulk of the dried coconut chunk. The chunks had a true rich flavor and a characteristically sweet taste.

On storage it was found that the product of this invention possessed characteristics which are superior to those of fresh coconut or of conventionally dried coconut. Whereas conventionally dried coconut may turn brown after a period of about 6–9 months, the product of this invention retained its snow-white color for periods of 18 months or longer.

It is particularly characteristic of this new product that it may be toasted to obtain a light brown surface thereon, and that this toasted product otherwise possesses all the advantages of the untoasted product. In comparison, a coconut chunk dried by conventional procedures is rendered even less edible and more hard by toasting.

It is possible to readily reconstitute the dehydrated product hereinbefore described by combining the same with reconstituting liquid, e.g. water or aqueous solution of a sweetening agent e.g. sugar, to get an improved reconstituted product characterized by highly desirable texture, flavor, and appearance and which more closely resembles fresh coconut than does the reconstituted conventionally dried product. Reconstitution to a moisture level of e.g. 50% occurs very quickly and usually in a matter of minutes. A conventionally dried product would not be fully reconstituted for several hours under the same conditions and, in any event, it could not be reconstituted to as high a moisture level.

It will be apparent to those skilled-in-the-art that although the invention has been described in terms of a specific example, various modifications and changes may be made which fall within the scope of the invention.

What is claimed is:

1. A crisp, dry, and tasty dehydrated chunk coconut product comprising coconut containing about 1–5% water, having substantially the same shape and size as the fresh coconut chunk from which it was prepared, a bulk density of 15 pounds per cubic foot, white color, and extended storage life, prepared by slowly freezing fresh coconut meat at an environmental temperature between 20° F. and minus 40° F., forming said coconut meat into a shallow bed, and passing warm air through said shallow bed.

2. A crisp, dry, and tasty dehydrated chunk coconut product comprising coconut containing less than about 1% water, having substantially the same shape and size as the fresh coconut chunk from which is was prepared, a bulk density of 15 pounds per cubic foot, white color, and extended storage life, prepared by slowly freezing fresh coconut meat at an environmental temperature of 20° F. to minus 40° F., forming said coconut meat into a shallow bed, and passing warm air through said shallow bed for 4–5 hours.

3. The method of preparing a dehydrated chunk coconut product which comprises slowly freezing fresh coconut meat at an environmental temperature between 20° F., and minus 40° F., forming said coconut meat into a shallow bed, and passing warm air through said shallow bed until the moisture content of said coconut meat is about 1%–5% thereby producing a product dehydrated coconut which is crisp, dry, and tasty.

4. The method of preparing a dehydrated chunk coconut product which comprises slowly freezing fresh coconut meat at an environmental temperature of 20° F. to minus 40° F., thawing said coconut, forming said coconut meat into a shallow bed, and passing warm air through said shallow bed until the moisture content of said coconut meat is about 1% thereby producing a product dehydrated coconut which is crisp, dry, and tasty.

5. The method of preparing a dehydrated chunk coconut product which comprises slowly freezing fresh coconut meat at an environmental temperature of 20° F. to minus 40° F., forming said coconut meat into a shallow bed, and passing air at temperature of 140–170° F. through said bed for 4–5 hours thereby producing a product dehydrated coconut meat which is crisp, dry, and tasty.

6. The method of preparing a dehydrated chunk coconut product which comprises slowly freezing fresh coconut meat at an environmental temperature of 20° F. to minus 40° F., forming said coconut meat into a shallow bed having depth less than 1.5 inches, and passing air at temperature of 140–170° F. through said bed for 4–5 hours thereby producing a product dehydrated coconut meat which is crisp, dry, and tasty.

7. The method of preparing a dehydrated chunk coconut product which comprises freezing fresh coconut meat at an environmental temperature of minus 30° F. to minus 40° F. for 16–24 hours, forming said coconut meat into a shallow bed, and passing air through said bed at superficial velocity of at least 100 feet per minute and temperature of 140–170° F. for 4–5 hours thereby producing a product dehydrated coconut meat which is crisp, dry, and tasty.

8. The method of preparing a dehydrated coconut which comprises forming fresh coconut meat into chunks having minimum dimension at least about 0.25 inch, freezing said chunks at an environmental temperature of minus 30° F. to minus 40° F. for 16–24 hours, forming said coconut meat into a bed having depth less than 1.5 inches, and passing air through said bed at 100–500 feet per minute superficial velocity and temperature of 140° F.–170° F. for 4–5 hours thereby producing a product dehydrated coconut meat which is crisp, dry, and tasty.

9. The method of preparing a dehydrated chunk coconut product which comprises freezing fresh coconut meat at an environmental temperature of minus 30° F. to minus 40° F. for 16–24 hours, forming a monolayer of coconut meat having depth less than 1.5 inches, and passing air downwardly through said monolayer at 100–500 feet per minute superficial velocity and temperature of 140° F.–170° F. for 4–5 hours thereby producing a product dehydrated coconut meat which is crisp, dry, and tasty and containing less than about 1% moisture by weight.

References Cited in the file of this patent

UNITED STATES PATENTS

| 2,147,752 | Northcutt | Feb. 21, 1939 |
| 2,583,697 | Hendry et al. | Jan. 29, 1952 |

FOREIGN PATENTS

| 539,477 | Great Britain | Sept. 12, 1941 |

OTHER REFERENCES

"Desiccating Shredded Coconut," by Buchanan, Jr., Food Industries, October 1928, pp. 9–12.

UNITED STATES PATENT OFFICE

CERTIFICATE OF CORRECTION

December 15, 1959

Patent No. 2,917,389

Ernest L. Earle, Jr., et al.

It is hereby certified that error appears in the printed specification of the above numbered patent requiring correction and that the said Letters Patent should read as corrected below.

Column 6, lines 11 and 20, for the numerals "100-500" read -- 100-150 --.

Signed and sealed this 17th day of May 1960.

(SEAL)
Attest:

KARL H. AXLINE
Attesting Officer

ROBERT C. WATSON
Commissioner of Patents